United States Patent
Huang

(10) Patent No.: US 7,984,532 B2
(45) Date of Patent: Jul. 26, 2011

(54) HINGE WITH VARIABLE TORQUE

(75) Inventor: Po-Ching Huang, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 683 days.

(21) Appl. No.: 11/647,263

(22) Filed: Dec. 29, 2006

(65) Prior Publication Data

US 2007/0186382 A1 Aug. 16, 2007

(30) Foreign Application Priority Data

Feb. 16, 2006 (TW) ................................ 95105240 A

(51) Int. Cl.
*E05D 11/08* (2006.01)
(52) U.S. Cl. ......................................................... 16/342
(58) Field of Classification Search .................... 16/342, 16/341, 340; 361/679.27, 679.11, 679.12; 403/119–121, 146; 455/575.1, 575.3, 575.4, 455/550.1
See application file for complete search history.

(56) References Cited

U.S. PATENT DOCUMENTS

| 3,359,685 | A | * | 12/1967 | Hodgen | 49/391 |
|---|---|---|---|---|---|
| 4,734,955 | A | * | 4/1988 | Connor | 16/332 |
| 5,491,874 | A | * | 2/1996 | Lowry et al. | 16/342 |
| 5,752,293 | A | * | 5/1998 | Lowry et al. | 16/342 |
| 6,286,187 | B1 | * | 9/2001 | Chang | 16/340 |
| 6,314,614 | B1 | * | 11/2001 | Kuehl | 16/342 |
| 6,349,449 | B1 | * | 2/2002 | Kuehl | 16/342 |
| 6,761,501 | B1 | * | 7/2004 | Nakatani | 403/109.5 |
| 2002/0112319 | A1 | * | 8/2002 | Kida | 16/342 |
| 2003/0042109 | A1 | * | 3/2003 | Bacon | 192/223 |
| 2006/0236504 | A1 | * | 10/2006 | Lu et al. | 16/342 |
| 2007/0192994 | A1 | * | 8/2007 | Chuang | 16/342 |
| 2007/0214605 | A1 | * | 9/2007 | Tu | 16/342 |

FOREIGN PATENT DOCUMENTS

DE 2534024 A * 2/1976

* cited by examiner

*Primary Examiner* — Chuck Y. Mah

(74) *Attorney, Agent, or Firm* — Winston Hsu; Scott Margo

(57) ABSTRACT

A hinge with variable torque is disclosed to include a first part, which has a shaft at one side thereof and recessed portions on the peripheral wall of the shaft, and a second part, which has a sleeve disposed at one side thereof and grooves on the inside wall of the sleeve. The sleeve is pivotally coupled to the shaft of the first part. A first contact area and a first friction force are produced between the peripheral wall of the shaft and the inside wall of the sleeve when the first part is turned to a first angle relative to the second part, and a second contact area and a second friction force are produced between thereinbetween when the first part is turned to a second angle relative to the second part.

9 Claims, 4 Drawing Sheets

HINGE WITH VARIABLE TORQUE

BACKGROUND OF THE INVENTION

1. Field of the Invention

The present invention relates to hinges and more particularly, to a durable hinge that provides a variable torque.

2. Description of Related Art

FIG. 1 is an exploded view of a hinge according to the prior art. In FIG. 1, the hinge comprises a male hinge member 11 and a female hinge member 12. The male hinge member 11 has an end wall 111, a shaft 13 perpendicularly extending from the end wall 111, and a mounting portion 14 disposed at the other end remote from the shaft 13. The female hinge member 12 has an end wall 121, a sleeve 15 formed through the end wall 121, and a mounting portion 16 disposed at the other end remote from the end wall 121. Further, the end wall 111 of the male hinge member 11 has protruding blocks 112 and 113. The end wall 121 of the female hinge member 12 has protruding blocks 122 and 123.

During the operation of the traditional hinge, the shaft 13 of the male hinge member 11 is inserted into the sleeve 15 of the female hinge member 12, keeping the end wall 111 of the male hinge member 11 in contact with the end wall 121 of the female hinge member 12. When rotating the male hinge member 11 relative to the female hinge member 12, the protruding blocks 112 and 113 of the male hinge member 11 will be forced against the protruding blocks 122 and 123 of the female hinge member 12 subject to the angle of rotation of the male hinge member 11 relative to the female hinge member 12. When the protruding blocks 112 and 113 of the male hinge member 11 are stopped against the protruding blocks 122 and 123 of the female hinge member 12, the positive pressure (friction pressure) between the male hinge member 11 and the female hinge member 12 is relatively great so that the hinge provides a relatively great torsional force. On the other hand, when the protruding blocks 112 and 113 of the male hinge member 11 and the protruding blocks 122 and 123 of the female hinge member 12 are set apart, the positive pressure (friction pressure) between the male hinge member 11 and the female hinge member 12 is relatively small so that the hinge provides a relatively small torsional force. According to this design, the hinge according to the prior art provides different torsional force by means of changing the forward pressure (friction pressure) between the male hinge member 11 and the female hinge member 12, i.e., changing the relative position between the protruding blocks 112 and 113 of the male hinge member 11 and the protruding blocks 122 and 123 of the female hinge member 12. Therefore, the hinge according to the prior art provides different torque when the male hinge member 11 is rotated at different angles relative to the female hinge member 12.

However, this design does not allow smooth rotation of the male hinge member 11 relative to the female hinge member 12. Further, frequently changing the positive pressure (friction pressure) between the male hinge member 11 and the female hinge member 12 inevitably causes the protruding blocks 112 and 113 of the male hinge member 11 and the protruding blocks 122 and 123 of the female hinge member 12 to wear quickly. Once the protruding blocks 112 and 113 of the male hinge member 11 and the protruding blocks 122 and 123 of the female hinge member 12 start to wear, the hinge having the male hinge member 11 and the female hinge member 12 will be unable to function well.

SUMMARY OF THE INVENTION

According to the preferred embodiment of the present invention, the hinge comprises a first part and a second part. The first part has a first side and a shaft at the first side. The shaft has a peripheral wall. The second part has a second side and a sleeve disposed at the second side and pivotally coupled to the shaft of the first part. The sleeve has an inside wall disposed in contact with the peripheral wall of the shaft. Further, the sleeve has at least one groove on the inside wall, and the shaft has at least one recessed portion on the peripheral wall.

Therefore, by means of the at least one recessed portion on the peripheral wall of the shaft of the first part and the at least one groove on the inside wall of the sleeve of the second part, the contact area (friction area) between the first part and the second part is changed subject to the turning angle of the hinge, i.e., the hinge provides different torsional force when its first part is being turned to a different angle relative to the second part thereof. Further, because the hinge provides variable torque subject to change of the contact (friction) area between the first part and the second part of the hinge, the peripheral wall of the shaft of the first part and the inside wall of the sleeve of the second part do not wear quickly comparing with the hinge according to the prior art. Further, because the recessed portions of the shaft of the first part and the groove of the sleeve of the second part are not within the friction surface (the contact surface between the peripheral wall of the shaft and the inside wall of the sleeve), both the recessed portions of the shaft and the groove of the sleeve do not wear easily. Therefore, when compared with the hinge according to the prior art, the hinge of the present invention provides a relatively higher torque and is more durable in operation.

The first part of the hinge further comprises a first mounting portion at a third side thereof opposite to the shaft. The first mounting portion of the first part can be made in any of a variety of forms. Preferably, the first mounting portion of the first part has a plurality of first mounting through holes. The second part of the hinge further has a second mounting portion at a fourth side thereof opposite to the sleeve. The second mounting portion of the second part can be made in any of a variety of forms. Preferably, the second mounting portion of the second part has a plurality of second mounting through holes. The sleeve of the second part further comprises an open chamber, preferably, a cylindrical open chamber. The at least one groove of the sleeve is formed on the inside wall of the cylindrical open chamber. The number of the at least one groove of the sleeve is preferably within the range 1~3. The shaft of the first part further comprises a pillar, preferably a cylinder. The at least one recessed portion is formed on the peripheral wall of the cylinder. The number of the at least one recessed portion is preferably within the range 2~8. The hinge of the present invention can be used in any of a variety of electronic devices. For example, the hinge can be mounted between the display screen and the main body of a notebook computer, or the display screen and the base member of a cell phone.

DETAILED DESCRIPTION OF THE PREFERRED EMBODIMENT

Figure 1:
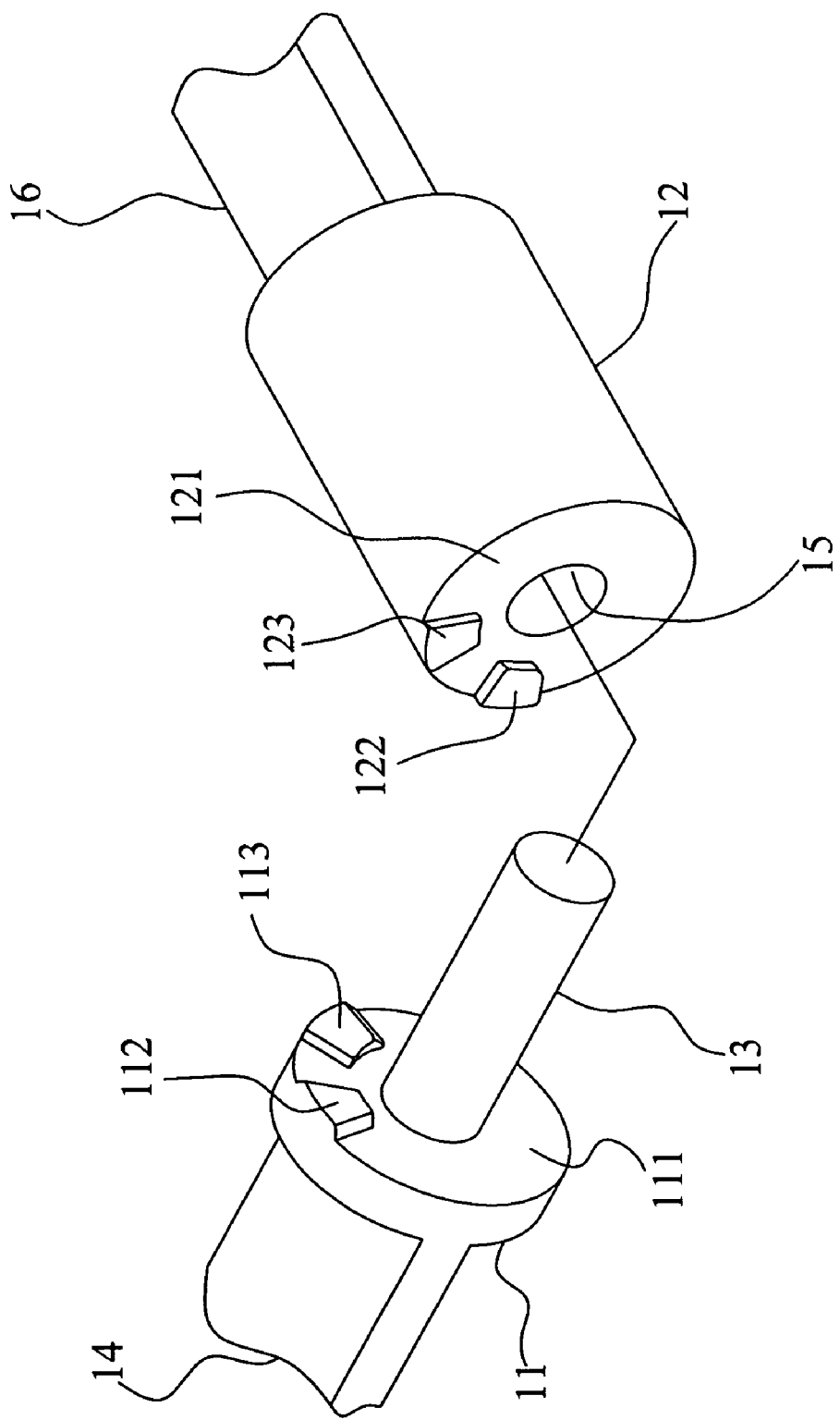
FIG. 1 is an exploded view of a hinge according to the prior art.
Figure 2:
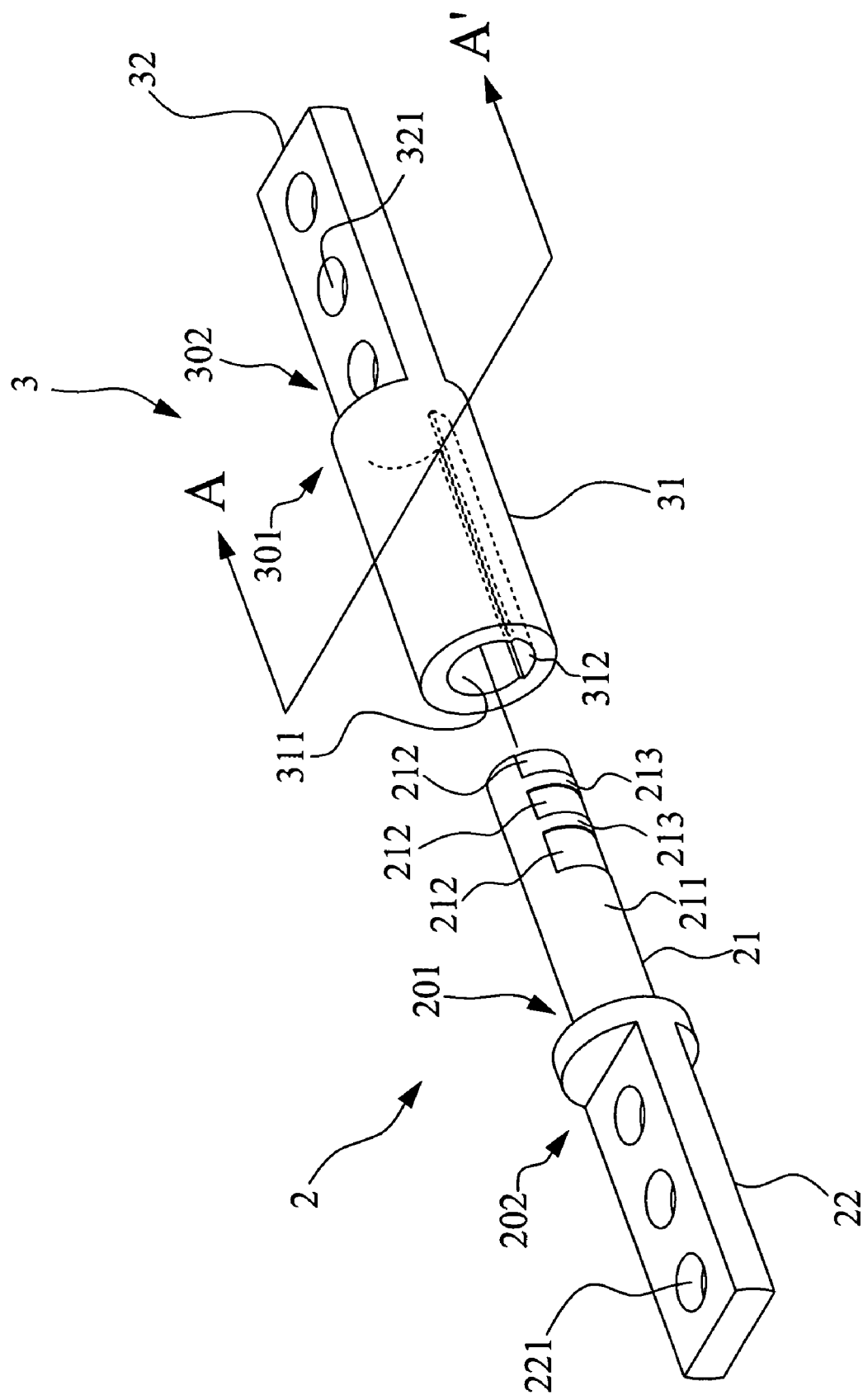
FIG. 2 is an exploded view of a hinge with variable torque according to the present invention.

Referring to FIG. 2, a hinge in accordance with the preferred embodiment of the present invention is shown comprised of a first part 2 and a second part 3.

The first part 2 has a first side 201, a third side 202 opposite to the first side 201, a shaft 21 at the first side 201, and a first mounting portion 22 at the third side 202. The first mounting portion 22 has three first mounting through holes 221. The second part 3 has a second side 301, a fourth side 302 opposite to the second side 301, a sleeve 31 at the second side 301, and a second mounting portion 32 at the fourth side 302. The second mounting portion 32 has three second mounting through holes 321. As shown in FIG. 2, the shaft 21 has three recessed portions 212 formed on the peripheral wall 211 thereof, and two reinforcing ribs 213 respectively formed on the peripheral wall 211 between each two adjacent recessed portions 212. Further, the sleeve 31 of the second part 3 has a groove 312 formed on the inside wall 311 thereof In this embodiment, the diameter of the peripheral wall 211 of the shaft 21 of the first part 2 is nominally smaller than the diameter of the inside wall 311 of the sleeve 31 of the second part 3.

Figure 3:
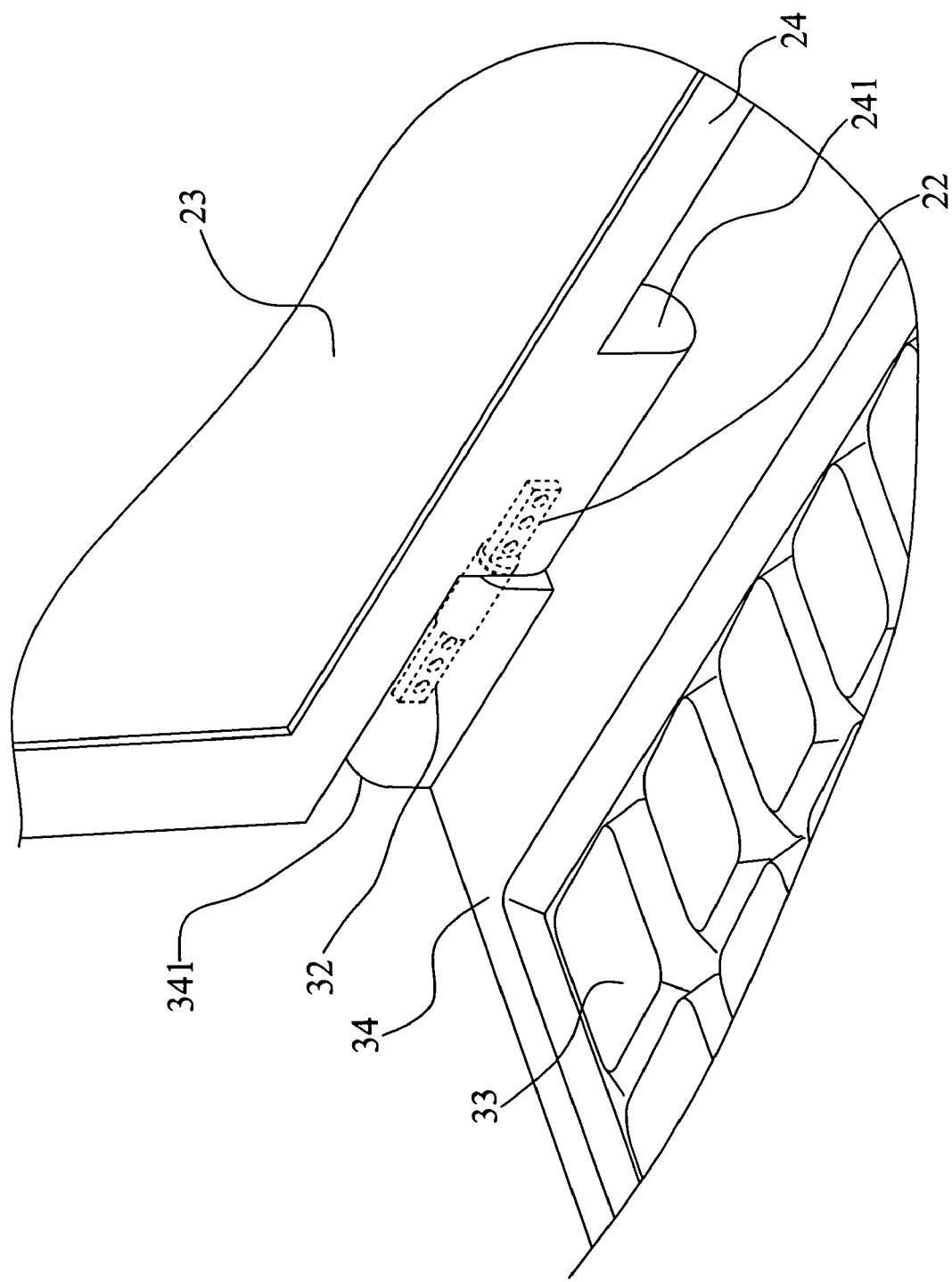
FIG. 3 is a schematic drawing showing the hinge of the present invention used in a notebook computer.

FIG. 3 is a schematic view showing the hinge of the preferred embodiment of the present invention used in a notebook computer. Please refer to FIG. 2 and FIG. 3, the first mounting portion 22 of the first part 2 of the hinge is affixed to a mounting block 241 at the outer frame 24 of the display screen 23 of the notebook computer, and the second mounting portion 32 of the second part 3 of the hinge is affixed to a mounting block 341 at the outer frame 34 of the main body 33 of the notebook computer. As shown in FIG. 3, the sleeve 31 is pivotally coupled to the shaft 21, and the peripheral wall 211 of the shaft 21 is kept in contact with the inside wall 311 of the sleeve 31. Thus, the display screen 23 of the notebook computer can be coupled to the main body 33, and the hinge of the preferred embodiment of the present invention provides different torsional force when the display screen 23 is rotated to different angles relative to the main body 33 of the notebook computer.

Figure 4A:
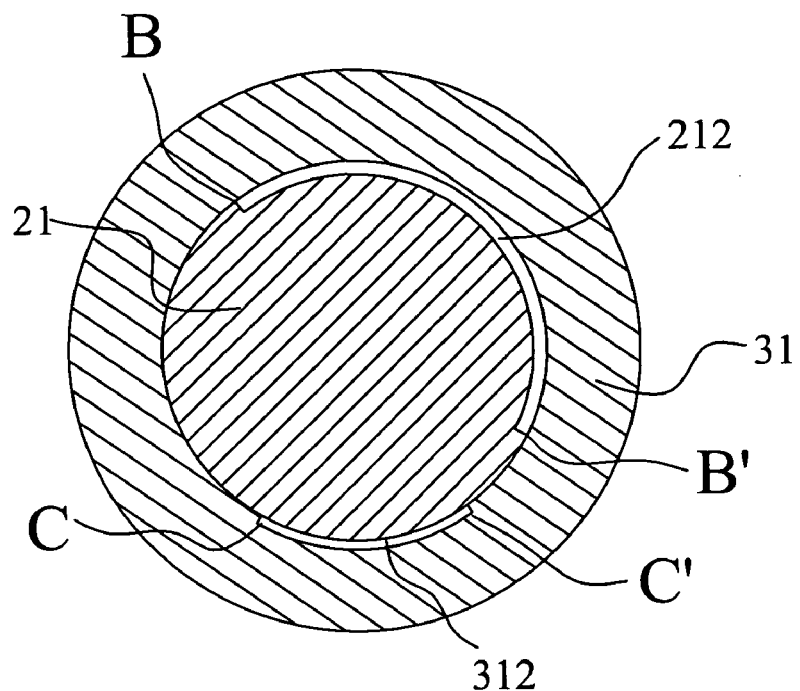
FIG. 4A is schematic sectional view taken along line A-A' of FIG. 2, showing the status of a first contact area between the first part and the second part of the hinge.
Figure 4B:
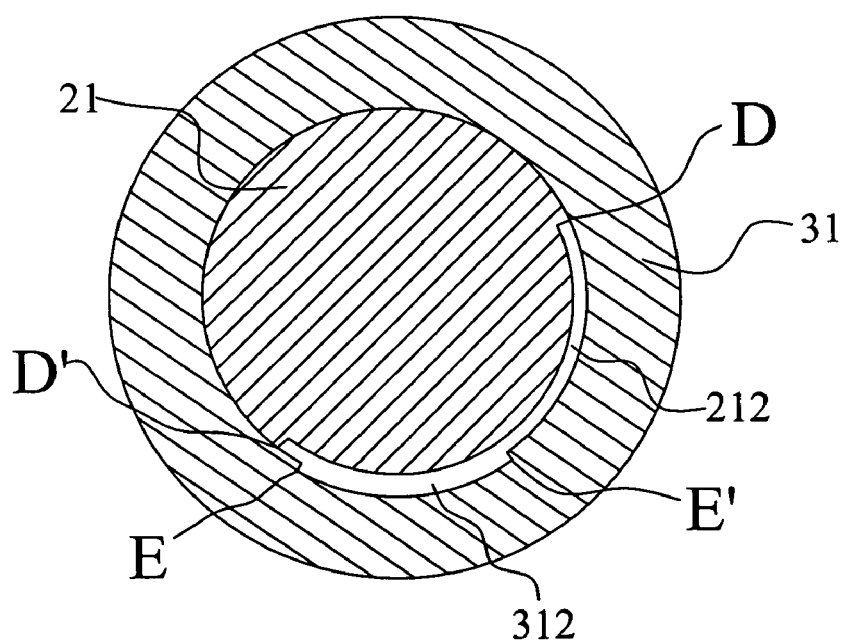
FIG. 4B is a schematic sectional view taken along line A-A' of FIG. 2, showing the status of a second contact area between the first part and the second part of the hinge.

FIGS. 4A and 4B are schematic sectional views taken along line A-A' of FIG. 2. FIG. 4A shows the status of a first contact area between the first part and the second part of the hinge. FIG. 4B shows the status of a second contact area between the first part and the second part of the hinge.

Referring to FIG. 4A, when the first part 2 of the hinge is turned to a first angle relative to the second part 3, the recessed portions 212 of the shaft 21 and the groove 312 of the sleeve 31 are set apart. In other words, the side length of the cross section of the first contact area between the first part 2 and the second part 3 of the hinge is equal to the resultant length after the length of the circular arc CC' (in counter-clockwise direction) is subtracted from the length of the circular arc BB' (in counter-clockwise direction).

Referring to FIG. 4B, when the first part 2 of the hinge is turned to a second angle relative to the second part 3, the recessed portions 212 of the shaft 21 and the groove 312 of the sleeve 31 are set face to face. Meanwhile, the side length of the cross section of the second contact area between the first part 2 and the second part 3 of the hinge is equal to the length of the circular arc DD' (in counter-clockwise direction), which is equal to the length of the circular arc BB' shown in FIG. 4A. Therefore, the first contact area between the first part 2 and the second part 3 that exists in FIG. 4A is smaller than the second contact area between the first part 2 and the second part 3 that exists in FIG. 4B.

Further, since the torsional force provided by the hinge of the preferred embodiment of the present invention is directly proportional to the contact area between the first part and the second part thereof, the torsional force provided by the hinge of the preferred embodiment of the present invention during the condition shown in FIG. 4A is relatively smaller than that in the condition shown in FIG. 4B.

In conclusion, by means of the at least one recessed portion on the peripheral wall of the shaft of the first part of the hinge and the groove on the inside wall of the sleeve of the second part of the hinge, the contact area (friction area) between the first part and the second part of the hinge of the preferred embodiment of the present invention is variable subject to the relative angle between the first part and the second part. Further, since the hinge of the preferred embodiment of the present invention provides a variable torque subject to change of the contact (friction) area between the first part and the second part thereof, the peripheral wall of the shaft of the first part and the inside wall of the sleeve of the second part do not wear quickly with operation. Further, because the recessed portions of the shaft of the first part and the groove of the sleeve of the second part are not within the friction surface (the contact surface between the peripheral wall of the shaft and the inside wall of the sleeve), both the recessed portions of the shaft and the groove of the sleeve do not wear easily. Therefore, when compared with the hinge according to the prior art, the hinge of the present invention provides a relatively higher torque and is more durable in operation.

Although the present invention has been explained in relation to its preferred embodiment, it is to be understood that many other possible modifications and variations can be made without departing from the spirit and scope of the invention as hereinafter claimed.

What is claimed is:

1. A hinge with variable torque comprising:
    a first part, having a first side and a shaft at the first side of the first part, the shaft having a peripheral wall; and
    a second part, having a second side and a sleeve disposed at the second side of the second part and pivotally coupled to the shaft of the first part, the sleeve having an inside wall, the peripheral wall of the shaft being kept in contact with the inside wall of the sleeve once the shaft is inserted into the sleeve;
    wherein the sleeve has at least one groove on the inside wall; the shaft has at least two recessed portions on the peripheral wall and at least one reinforcing rib formed between two adjacent recessed portions.

2. The hinge as claimed in claim 1, wherein the first part further has a third side opposite to the first side thereof, a first mounting portion disposed at the third side of the first part, and a plurality of first mounting through holes defined in the first mounting portion of the first part.

3. The hinge as claimed in claim 1, wherein the second part further has a fourth side opposite to the second side thereof, a second mounting portion disposed at the fourth side of the second part, and a plurality of second mounting through holes defined in the second mounting portion of the second part.

4. The hinge as claimed in claim 1, wherein the diameter of the peripheral wall of the shaft of the first part is nominally smaller than the diameter of the inside wall of the sleeve of the second part.

5. The hinge as claimed in claim 1, wherein a first contact area and a first friction force are produced between the peripheral wall of the shaft and the inside wall of the sleeve when the first part is turned to a first angle relative to the second part; a second contact area and a second friction force are produced between the peripheral wall of the shaft and the inside wall of the sleeve when the first part is turned to a second angle relative to the second part.

6. The hinge as claimed in claim 5, wherein at least one of the recessed portions of the first part and the at least one groove of the second part are set apart when the first part is turned to the first angle relative to the second part; the at least one recessed portion of the first part and the at least one groove of the second part are kept face to face when the first part is turned to the second angle relative to the second part.

7. The hinge as claimed in claim 5, wherein the first contact area and the first friction force are respectively smaller than the second contact area and the second friction force.

8. The hinge as claimed in claim 1, wherein the sleeve further comprises a cylindrical open chamber; the inside wall is provided inside the cylindrical open chamber, and the at least one groove is provided at the inside wall.

9. The hinge as claimed in claim 1, wherein the shaft further comprises a cylinder; the peripheral wall is provided on the cylinder, and the at least one recessed portion is provided at the peripheral wall.

* * * * *